(12) United States Patent
Mandalia

(10) Patent No.: US 6,324,584 B1
(45) Date of Patent: *Nov. 27, 2001

(54) METHOD FOR INTELLIGENT INTERNET ROUTER AND SYSTEM

(75) Inventor: Baiju Dhirajlal Mandalia, Boca Raton, FL (US)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,093

(22) Filed: Nov. 26, 1997

(51) Int. Cl.⁷ .................................................... G06F 17/30
(52) U.S. Cl. .......................................... 709/238; 709/217
(58) Field of Search .................................. 709/213, 216, 709/304, 217, 228, 229, 203, 238; 711/138; 364/230; 713/201; 395/187.01; 707/9, 10

(56) References Cited

U.S. PATENT DOCUMENTS

| | | | | |
|---|---|---|---|---|
| 5,201,401 | * | 4/1993 | Bohner et al. ........................ | 711/138 |
| 5,649,185 | * | 7/1997 | Antognini et al. ..................... | 707/9 |
| 5,678,041 | * | 10/1997 | Baker et al. ........................... | 707/9 |
| 5,708,832 | * | 1/1998 | Inniss et al. .......................... | 707/10 |
| 5,740,231 | * | 4/1998 | Cohn et al. ....................... | 379/88.22 |
| 5,761,507 | * | 6/1998 | Govett et al. ....................... | 709/304 |
| 5,774,660 | * | 6/1998 | Brendel et al. ..................... | 709/201 |
| 5,864,852 | * | 1/1999 | Luotonen ............................. | 713/201 |
| 5,884,046 | * | 4/2000 | Hashimoto et al. ................. | 709/203 |
| 5,896,506 | * | 4/1999 | Ali et al. .............................. | 709/213 |
| 5,918,013 | * | 6/1999 | Mighdoll et al. .................... | 709/217 |
| 6,047,313 | * | 10/1996 | Antonov .............................. | 709/238 |

OTHER PUBLICATIONS

Article entitled: "Introduction to TCP/IP", by H. Gilbert, Copyright 1995 PCLT.

* cited by examiner

Primary Examiner—Dung C. Dinh
Assistant Examiner—Hien C. Le
(74) Attorney, Agent, or Firm—Akerman Senterfitt

(57) ABSTRACT

A method and system for operating a router in a computer network. When the system receives a request from a client machine connected to the computer network to access data at a remote server location having an address, it accesses the remote server at the address via the computer network. The router causes the data to be transmitted from the server to the router. The system maintains a pre-determined profile at the router, which profile contains storage selection criteria. The system selectively determines whether the data is to be stored at the router by comparing the data and/or the address to the storage selection criteria. If the data conforms to the criteria, it is stored in a mass storage device at the router and transmitted to the client machine which initiated the request. When a subsequent request is received at the router to access the data at the remote server location the router first accesses the data from the mass storage device to determine if the information is already present locally. If so, the data is transmitted to the client machine which initiated the subsequent request. A time out system is provided to delete outdated data.

17 Claims, 5 Drawing Sheets

METHOD FOR INTELLIGENT INTERNET ROUTER AND SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to Internet and more particularly to an intelligent router system having a capability to locally store certain data based upon a profile. The data, which has been received for re-transmission, may also be selectively discarded by the router if it fails to meet certain filter criteria established by an addressee.

2. Description of the Related Art

There are two basic problems confronting Internet users, namely (1) slow delivery of information over the Internet due to congestion; and (2) delivery of unsolicited or objectionable material that an Internet user does not want to receive. Conventionally, mirroring of web sites and push technology have been used to circumvent the congestion problems faced by users of the Internet. In both cases, however, the network remains more heavily loaded due to on-demand user requirements which result in heavy loading during predictable time periods. Further, for blocking unsolicited and objectionable material, special software is required on the users computer. Finally, due to constant evolution of standards, it is becoming complex for users to manage this filtering software.

The Internet is arranged so that every computer has a unique name or address by which it can be identified. When data is transmitted over the Internet, it is generally broken down into smaller groupings called "packets". In addition to the data which is being transmitted, the packets will normally include important transmission information such as the sender's identity or Internet Packet Address (IP Address), the addressee or intended recipient's IP Address, the actual data (or data request), and so on. Each packet which is transmitted from a user's computer will typically travel through several network devices such as hubs, switches, and routers. If a user's computer is part of a local area network, the packet will generally travel along a cable until it arrives at a hub to which the cable is connected. The hub or "repeater" as it is sometimes called, will retransmit the packet to another network device (such as a switch) until the packet reaches a router. The router examines the information transmitted with the packet and determines the best way for it to get to its destination. Once it has determined how the packet is to be sent, the router selects another router at some other location and transmits the message to the router in the direction the packet is intended to travel. For example, if the message is going from New York to California, the router might send the packet to a router located in an intermediate city such as Chicago along a high speed communication cable. Once there, another router will determine a subsequent router to which the packet will be sent next. In this way the packet is transmitted from router to router until the packet has nearly reached its destination. When the packet is near to its destination, it is eventually passed to a local hub which will retransmit the message to its intended recipient computer. The recipient computer then reassembles the packet with other parts of the original message to create the complete set of transmitted data. Thus, conventional routers function in a network by connecting wide area networks and local area networks to allow traffic and communication of packet information to be transmitted to selected destinations. Routers conventionally do not have mass data storage devices, such as magnetic hard disks or optical storage media. Further, conventional routers are commonly comprised of a single central processing unit, operating in unison.

SUMMARY OF THE INVENTION

A mass storage medium, such as a hard disk or optical storage medium is added to provide a subscriber database and also to store Internet information. In particular, each time an Internet page is received and transmitted by the router, the router captures and stores in the mass storage medium, any page that conforms with a pre-determined profile selection. To avoid delays to the actual communication, a second "background" processor preferably performs the data storage and retrieval function without disrupting the actual messaging process. In case of subsequent subscriber access to the stored web sites, the router is programmed to use the stored copy of an Internet page when available. To avoid old information, a user selected timer will ensure that files which are older than a pre-determined maximum will be deleted. Further, each time an Internet page is received and transmitted by the router, the intelligent router blocks and rejects any page or message that matches certain criteria in the profile filter for one of the subscribers. Once again, the background processor is preferably provided to ensure acceptable performance for this process Accordingly, a method and system is disclosed for operating a router in a computer network. When the router receives a request from a client machine connected to the computer network to access data, such as a web page, at a remote server location having an address, the router accesses the information on the server at the address. The router thereafter causes the data to be transmitted from the server to the router. A pre-determined profile is stored at the router, which profile contains storage selection criteria. The system selectively determines whether the data is to be stored at the router by comparing the data and/or the address from which the data originated, to the storage selection criteria. If the data conforms to the criteria, it is stored in a mass storage device at the router and transmitted to the client machine which initiated the request. When a subsequent request is received at the router to access the data at the remote server location the router first accesses the data from the mass storage device to determine if the information is already present locally on the mass storage device. If so, the locally stored data is transmitted to the client machine which initiated the subsequent request. If not, the router retrieves the new requested data from its respective server or web site. A time out system is provided to delete outdated data stored on the mass storage device. If desired, a user of a client machine can be permitted to determine the criteria of the profile.

In one embodiment, the system preferably provides a time limit for maintaining the data in the mass storage device and deleting the data when the time limit has expired. If the data has been deleted from the mass storage device, it is re-accessed from the remote server location in response to the subsequent request and an updated version of the data is transmitted to the router. The updated data is then stored on the mass storage device and transmitted to the client machine which initiated the request.

In a further embodiment, the router is configured so that a user of a client machine is permitted to select a filter parameter to be applied to the pre-determined profile. The filter parameter is then used to selectively determine whether the data is to be transmitted to the client machine which initiated the request, based upon a comparison of the address and/or the data to the filter parameter. In a further alternative embodiment, a user profile is maintained at a router which is comprised of criteria for selectively rejecting data to be transferred to a particular address by the router. When data is received at the router data which is to be transferred to an address on the computer network it is compared to the user profile. The router automatically terminates transmission of the data if it does not conform to the criteria.

The system of the invention may, in one embodiment, consist of a programmable computer for routing data packets to selective addresses on a computer network. The system is provided with a mass storage device, such as a magnetic or optical data storage device. Further, suitable computer hardware and software is provided for receiving a request from a client machine to access data on a remote server having an address; and for responding to the request via the computer network; and for transmitting the data to the client machine which initiated the request. A pre-determined profile is stored on a memory device at the router. The profile defines a set of criteria for determining whether the data is to be stored on the mass storage device. In particular, the server address and/or data is evaluated to determine whether the data conforms to the criteria. The computer stores the data and the address if the data or address conforms to the criteria. Further, the system is configured to be responsive to a subsequent request (from the same or a different client machine) to access data on a remote server having an address; A search mechanism is provided for searching the mass storage device for data having an address which matches the address in the subsequent request. If such data exists, it is retrieved from the mass storage device and transmitted to the client machine which initiated the request. The computer is advantageously configured for tracking the length of time data has been stored on the mass storage device and for deleting the data when the length of time exceeds a preset time limit. If the data stored locally on the mass storage device has been deleted or is no longer available because it is obsolete, the router is programmed to respond to the subsequent request by accessing an updated version of the data on the server via the computer network. The router then stores the updated version of the data on the mass storage device and transmits the updated data to the client machine initiating the subsequent request.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
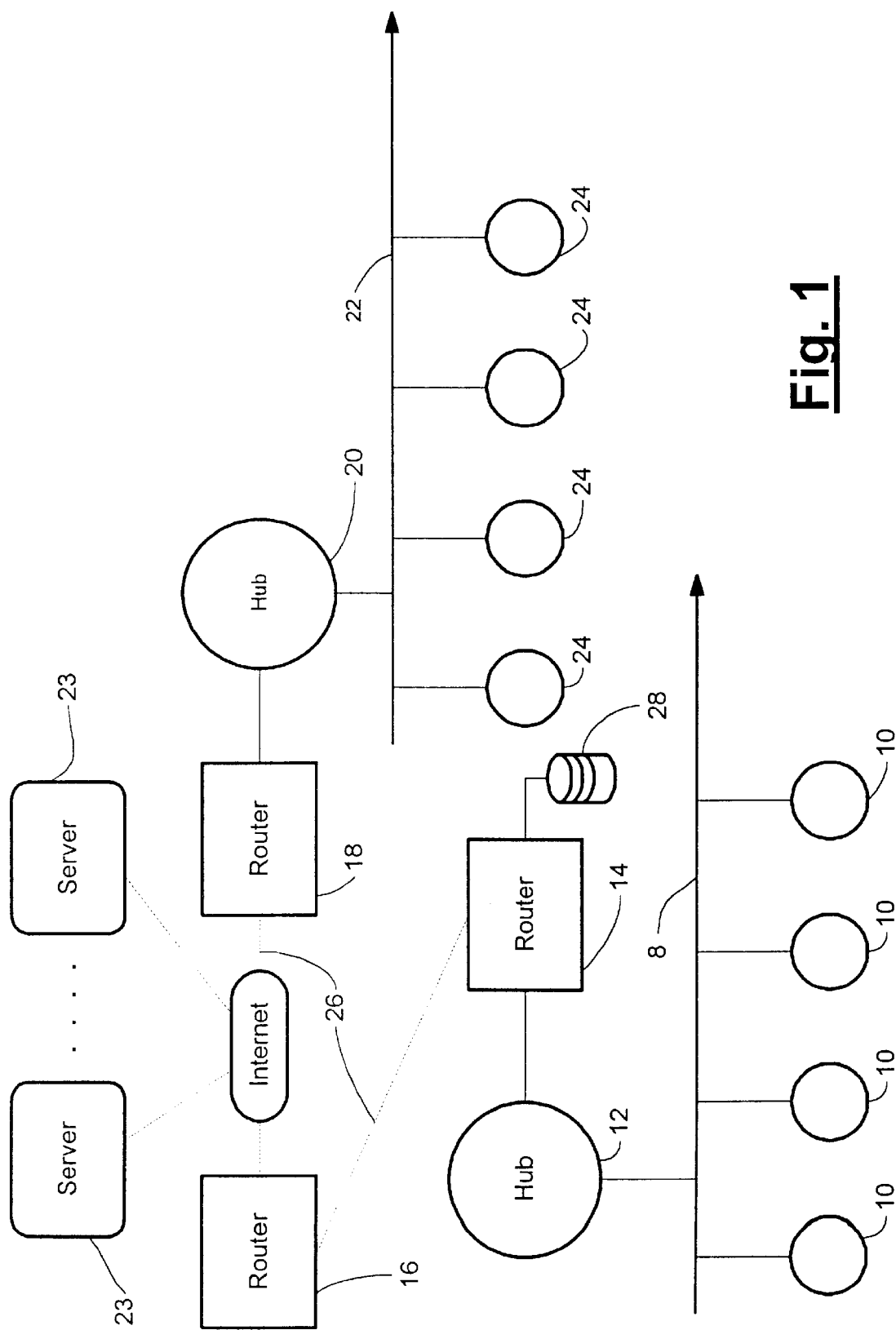
FIG. 1 is a block diagram showing the operation of an intelligent router in a global computer network.
Figure 2:
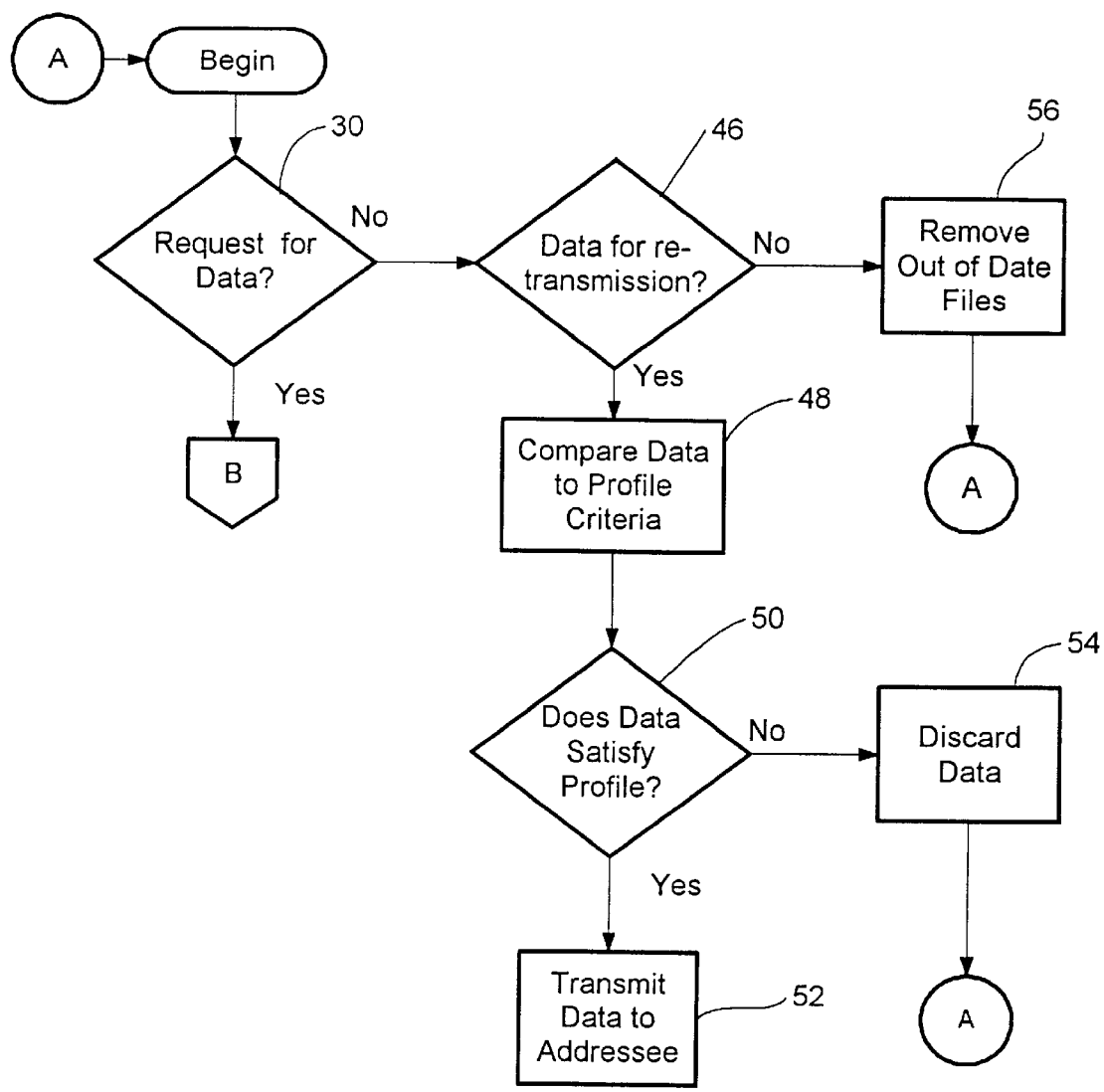
FIG. 2 is a flow chart illustrating a method for an intelligent router according to the present invention.

FIGS. 1 and 2 illustrate a method and apparatus according to the invention wherein the administration of the conventional router is modified to accept subscriber information and profiles for storing and blocking data. FIG. 1 illustrates a basic arrangement for communicating data over a global computer network, such as the Internet. As shown therein, one or more client machines 10 attached to a local area network (LAN) 8 can communicate with web site servers 23 or other client machines 24 connected to a LAN 22. One or more network devices such as hub 12 and 20 are used to connect the client machines 10, 24 to the Internet via the LAN's 8, 22.

Conventional routers 16, 18 are designed only to receive data packets from client machines 10, 24 and transmit the data packet onward to a subsequent router more closely situated to the destination of the data packet. High speed cable links 26 are typically used for this purpose. Such conventional routers 16, 18 do not provide any significant storage with regard to the data which they receive or transmit. By comparison, router 14 is configured to perform additional processing with regard to packet data so as to minimize traffic congestion over cable links 26 and control delivery of unsolicited or objectionable material that an Internet user does not want to receive.

Web site servers 23 are conventional units capable of being selectively accessed via a computer network by a client machine having a browser provided for such purpose. In the environment of the world wide web of the Internet, client machines 10, 24 effect transactions to web servers using the Hypertext Transfer Protocol (HTTP), which is a known application protocol providing users access to files including text, graphics, images, sound, video, and the like. HTML provides basic document formatting and allows the developer to specify links to other servers and files. According to the standard methods of accessing multiple web sites on the Internet, a network path or address is identified by a Uniform Resource Locator ("URL"). By using an HTML-compatible browser (such as the Internet Explorer application program available from Microsoft Corporation) a user of a client machine can specify a link to a particular desired web site identified with a URL. The client machine makes a request to the server identified by the URL and in return receives a specific document formatted according to HTML. The client machines 10, 24 can be connected to the server by means of the Internet, an intranet, or other known network connection.

Servers can be implemented by a variety of means including, for example, an IBM RISC System/6000 computer utilizing the AIX (Advanced Interactive Executive Version 4.1 and above) Operating System and a web server program, such as Netscape Enterprise Server Version 2.0, that supports interface extensions. The system preferably includes a graphical user interface for management and administration of the server. While the foregoing system will provide suitable results, it will be recognized by those skilled in the field of Internet servers that there exist a variety of other hardware/operating systems/web server application program combinations which may also be used.

Client machines, as that term is used herein, can be any of a variety of personal computers which are available from a number of well-known computer manufacturers. Such machines preferably comprise a central processing unit (CPU), including one or more memory devices and associated circuitry. The memory devices typically comprise an electronic random access memory and a bulk data storage medium, such as a magnetic disk drive. The system includes a pointing device operatively connected to the computer system through suitable interface circuitry, and at least one user interface display unit such as a video data terminal (VDT) operatively connected thereto. The CPU can be comprised of any suitable microprocessor or other electronic processing unit, as is well known to those skilled in the art. An example of such a CPU would include the Pentium brand microprocessor available from Intel Corporation or any similar unit such as an 80486 or 80386 type microprocessor.

The various hardware requirements for the computer system as described herein can generally be satisfied by any one of many commercially available high speed personal computers offered by manufacturers such as Compaq, Hewlett Packard, IBM Corp or Apple Computers. In a preferred embodiment as discussed herein, the operating system for the computer is one of the Windows family of operating systems, such as Windows 3.1, Windows NT, or Windows 95. However, the system is not limited in this regard, and the invention may also be used with any other type of computer operating system incorporating a graphical user interface.

Figure 3:
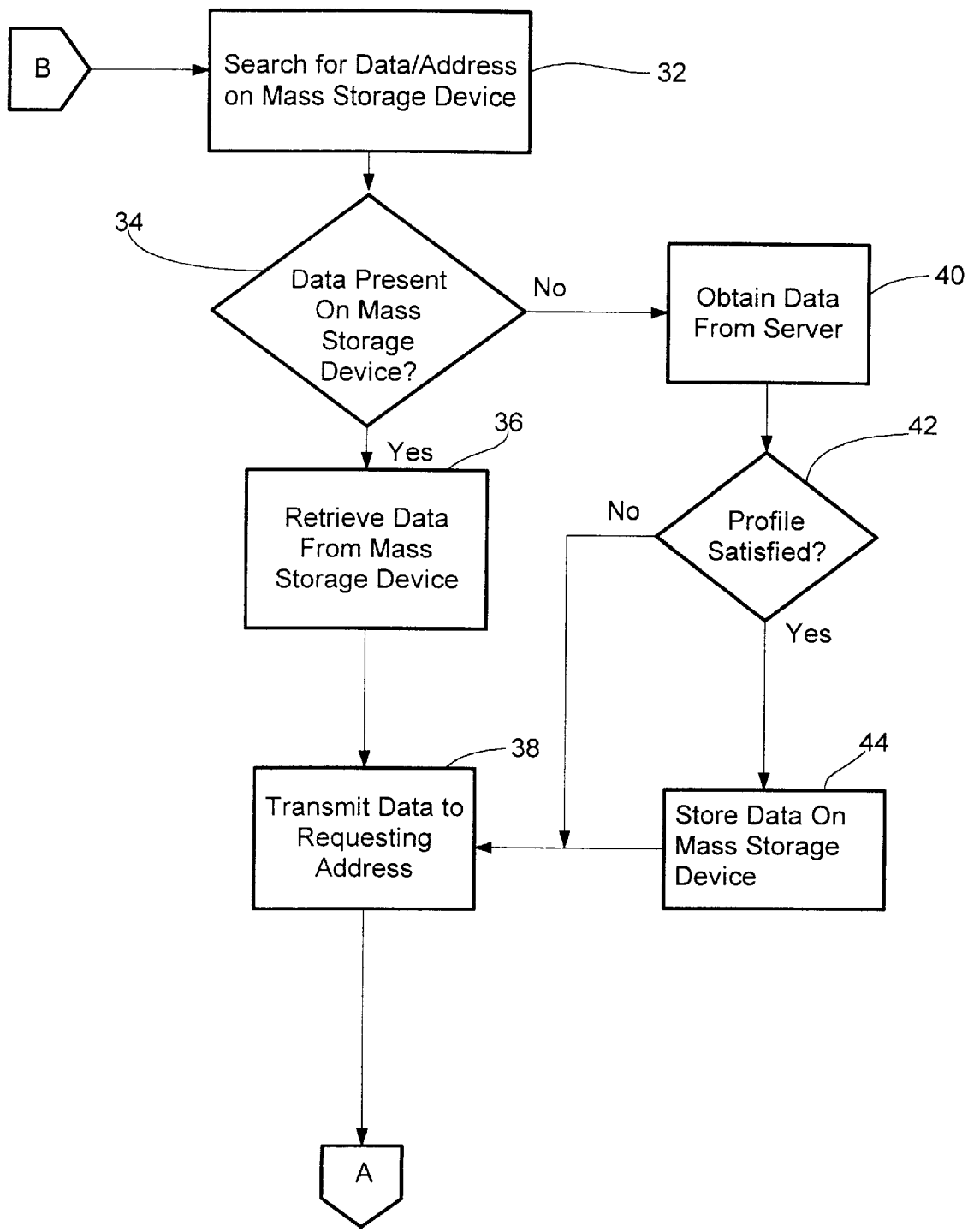
FIG. 3 is a continuation of the flow chart of FIG. 2.

FIGS. 2 and 3 illustrate the operation of router 14 in a preferred embodiment of the present invention. As shown therein, when a data packet is received in step 30, the router 14 determines initially whether a received data packet is a request for data or some other type of data transmission. If the data packet is a request for data (such as a web page), the router in step 32 searches for the address of the requested web page among the addresses of web page data stored on a mass storage unit 28. Mass data storage unit 28 may be a conventional magnetic hard disk, optical storage disk device, or any other type of suitable mass data storage device. The unit is preferably located at the router 14.

In step 34, the router 14 determines whether the web page data is present on the mass storage unit 28. If so, the data is retrieved from the mass storage unit in step 36. In step 38, the stored web page data is transmitted to the client machine which requested the data. Alternatively, if in step 34 the router determines that the requested data is not present on the router's mass storage unit 28, the data is requested and obtained from the web site server 23 in step 40 using conventional network protocols. The web page data thus obtained is evaluated in step 42 to determine whether it conforms to a subscriber data storage profile which would warrant storing said web page by the router 14.

The profile may be comprised of any desired set of criteria. In a preferred embodiment, such criteria are designed to identify web page data that is likely to be accessed on multiple occasions by the router 14 on behalf of a subscriber or client machine 10, 24. However, the invention is not limited in this regard and any other desired criteria may also be used for this purpose.

If the web page data satisfies the profile criteria established for determining that the data should be stored, the data is stored in mass storage unit 28 in step 44 and then transmitted to the network device at the requesting address in step 38. Alternatively, if the web page data does not satisfy the profile criteria, the data is simply transmitted in step 38 to the client machine which requested the data.

The profile as described herein also serves another purpose. Specifically, in step 30, if the data packet received by the router 14 is determined in step 46 not to be a request for web page data but rather a transmission of such data (or perhaps an e-mail data packet), then such data is compared to profile transmission criteria in step 48. The router 14 then determines if the data satisfies the transmission criteria in step 50. If so, the data is transmitted to the addressee in step 52. However, if the data does not satisfy the transmission criteria, it is discarded in step 54.

In FIG. 2, step 30 and 46 illustrate that the router will routinely look for data packets which are data requests or which comprise other types of data transmissions. In addition, however, the router 14 will in step 56 review the files which are stored on mass storage unit 28 will preferably delete those which are older than the maximum predetermined limit. Such routine purging of old files can be performed continuously in the manner shown in FIG. 2, or as necessary on an hourly, daily, or weekly basis. Thus, any network device requesting web page data from a server will preferably avoid receiving information which is outdated.

In order to minimize any performance degradation caused by the additional processing performed by router 14, the storage, retrieval and filtering functions are preferably performed by a co-processor. However, the invention is not limited in this regard and a single processor may also be used.

Figure 4:
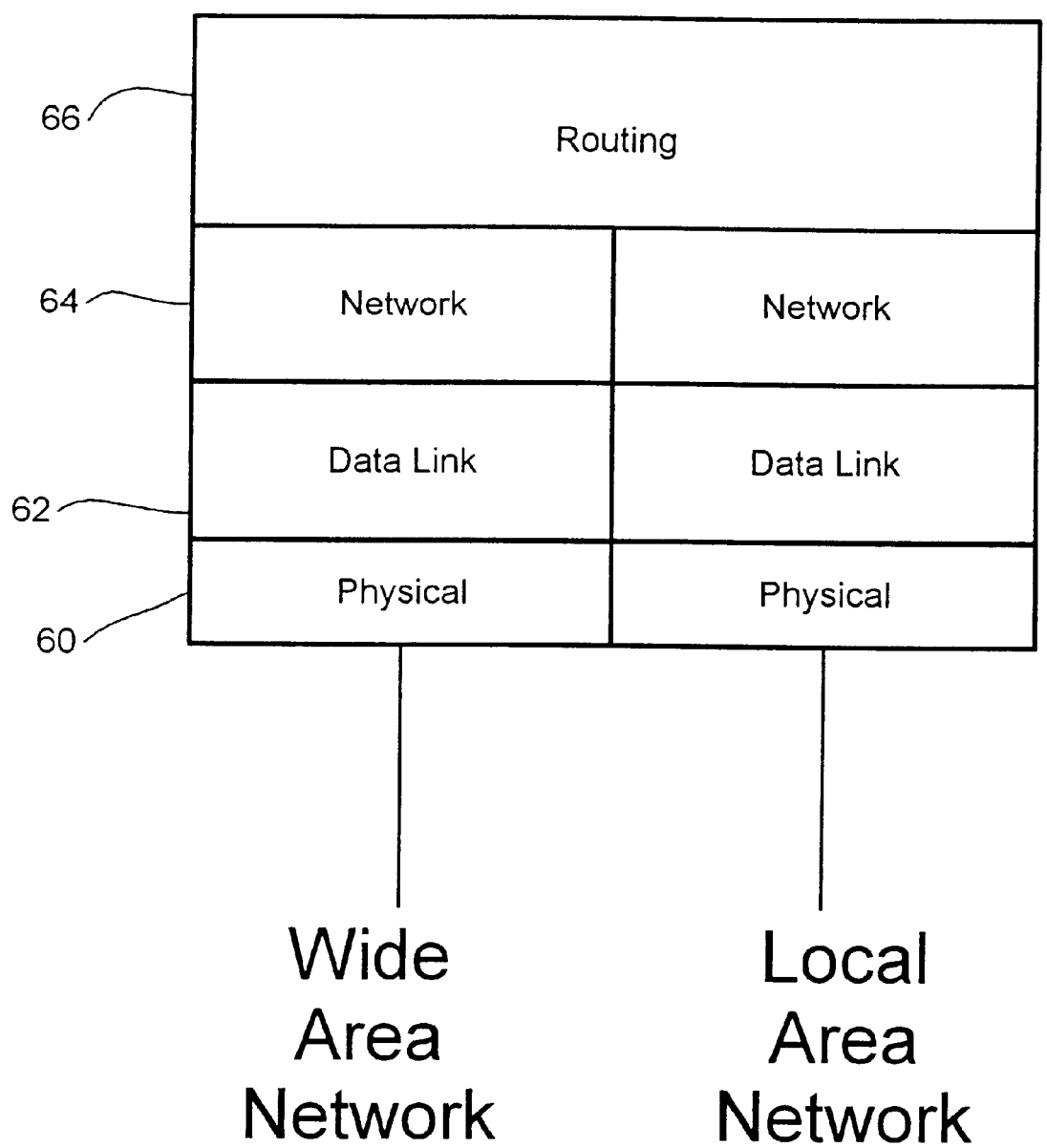
FIG. 4 illustrates a basic router architecture.

FIG. 4 illustrates a basic router architecture as is well known in the art. As shown therein, the router may connect a local area network to a wide area network. Physical layer 60 consists of line drivers, synchronization circuitry, and other components for managing the physical ports which connect the router to the networks. The next higher level is the data link level 62 which performs various error checking, flow control and sequencing operations to ensure error free delivery of all packets in a particular message group. Network level 64 typically provides additional functions such as resolution of destination addresses for routing purposes and determination of any intermediate routing data. Finally, at routing level 66, actual routing of the data packets is performed, for example by using a preconfigured table of addresses for network devices.

Figure 5:
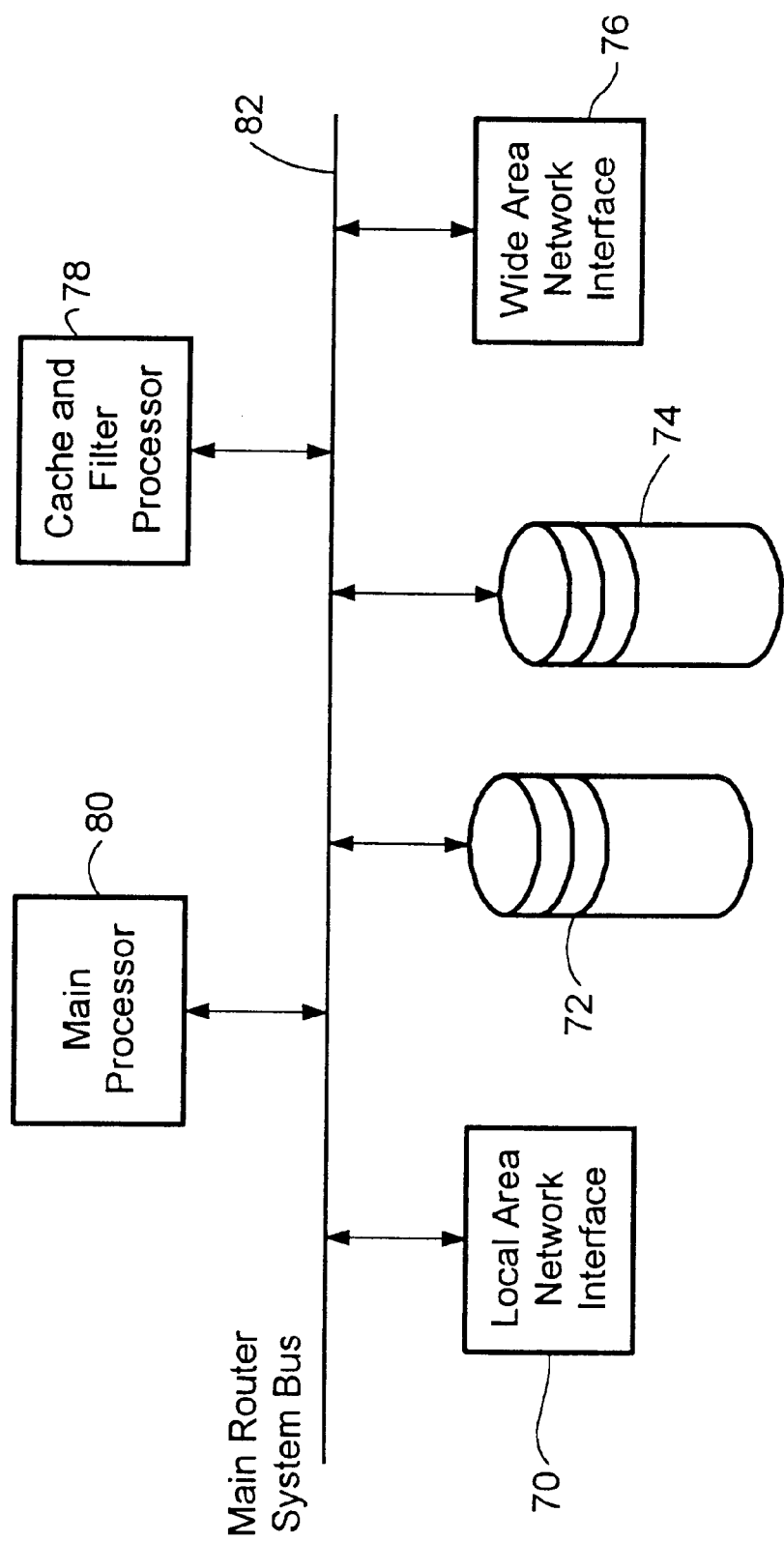
FIG. 5 is block diagram of a router according to the present invention.

A preferred embodiment of the router according to the present invention is shown in block diagram form in FIG. 5. As shown therein, local area network 70 and wide area network 76 are connected to a main router system bus 82. Main CPU or processor 80 controls the routing of data packets and controls the conventional aspects of the router operation. In addition to main processor 80, a cache and filter processor 78 is provided to perform the data storage and filtering processes which are outlined in FIGS. 2 and 3. Storage of web page data and addresses which satisfy profile criteria are stored in the main database 72. In addition, subscriber profile database 74 is provided for storage of profile information needed to evaluate whether data packets are to be stored, transmitted or discarded as described with respect to FIGS. 2 and 3. In FIG. 5, the subscriber database 74 is shown as a separate functional block. However, the two databases can also be maintained on a single mass storage device. In either case, the mass storage device can be any type of suitable mass data storage device, including for example, a magnetic disk type drive or an optical data storage device. Processors 80 and 78 may be any of several electronic computer microprocessors as will be readily recognized by those skilled in the art.

I claim:

1. A method for operating a router in a computer network comprising the steps of:

receiving at a router packets from a client machine connected to said computer network;

analyzing said packets to determine if a request has been received to access data at a remote server location having an address;

accessing with said router said remote server at said address via said computer network and causing said data to be transmitted to said router;

maintaining a pre-determined profile at said router, said profile containing storage selection criteria;

selectively determining whether said data is to be stored at said router by comparing at least one of said data and said address to said storage selection criteria; and, resolving a destination address for routing said data and determining intermediate routing data.

2. The method according to claim 1, further comprising the steps of:

storing said data in a mass storage device at said router; and routing said data to said client machine which initiated said request according to the resolved destination address and determined intermediate routing data.

3. The method according to claim 2 further comprising the steps of:

receiving via said network a subsequent request at said router to access said data at said remote server location;

accessing with said router said data from said mass storage device;

and routing said data to said client machine which initiated said subsequent request.

4. The method according to claim 1 further comprising the step of permitting a user of a client machine attached to said computer network to determine said criteria of said profile.

5. The method according to claim 2 further comprising the step of providing a time limit for maintaining said data in said mass storage device; and deleting said data when said time limit has expired.

6. The method according to claim 5 further comprising the steps of:

re-accessing with said router said remote server location in response to said subsequent request; and causing an updated version of said data to be transmitted to said router;

storing said updated version of said data in said mass storage device; and routing said updated version of said data to said client machine which initiated said subsequent request.

7. The method according to claim 1, further comprising the steps of:

allowing a user of a client machine attached to said computer network to select a filter parameter to be applied to said pre-determined profile; and selectively determining whether said data is to be routed to said client machine which initiated said request, based upon a comparison of at least one of said address and said data to said filter parameter.

8. The method according to claim 1 wherein said data comprises a web page.

9. A method for operating a router in a computer network, comprising:

maintaining at said router a user profile comprising criteria for selectively rejecting data to be transferred by said router, said profile containing storage selection criteria;

receiving at said router packets which are to be transferred to an address on said computer network;

analyzing said packets to determine if a request has been received to access data at a remote server location having an address;

comparing said data to said user profile and terminating transmission of said data if it does not conform to said storage selection criteria;

caching said data at said router if said data does conform to said storage selection criteria; and, resolving a destination address for routing said data and determining intermediate routing data.

10. A programmable computer for routing data packets to selective addresses on a computer network, said computer comprising:

mass storage means;

means for receiving at a router packets from a client machine to said computer network;

means for analyzing said packets to determine if a request has been received to access data on a remote server having an address;

means responsive to said request for accessing with said router said data on said server via said computer network;

means for resolving a destination address for routing said data and determining intermediate routing data;

means for routing said data to said client machine which initiated said request according to said resolved destination address and said determined intermediate routing data;

means for storing a pre-determined profile, said profile defining a set of criteria; and, means for determining whether said data is to be stored on said mass storage device by evaluating whether said data conforms to said criteria.

11. The programmable computer according to claim 10 further comprising means for selectively storing said data and said address if said data conforms to said criteria.

12. The programmable computer according to claim 11 further comprising means responsive to a subsequent request to access with said router data on a remote server having an address; and means for searching said mass storage device for data having an address which matches said address in said subsequent request.

13. The programmable computer according to claim 12 further comprising means for retrieving said data from said mass storage device and for routing said data to said client machine which initiated said request.

14. The programmable computer according to claim 12, further comprising means for determining the length of time data has been stored on said mass storage device and deleting said data when the length of time exceeds a time limit.

15. The programmable computer according to claim 14 further comprising means responsive to said subsequent request for accessing with said router an updated version of said data on said server via said computer network when said length of time exceeds said time limit.

16. The programmable computer according to claim 15, further comprising means for causing said updated version of said data to be stored on said mass storage device and for routing said updated data to said client machine initiating said subsequent request.

17. The programmable computer according to claim 13 wherein said message storage and retrieval processing is performed by a co-processor.

* * * * *